Oct. 30, 1945.

A. RICKENMANN 2,388,183

MACHINE FOR PRODUCING CIRCULAR SAWS

Filed Jan. 6, 1943

INVENTOR
ALFRED RICKENMANN
BY Singer, Ehlert, Stern & Carlberg
ATTORNEYS

Oct. 30, 1945. A. RICKENMANN 2,388,183
MACHINE FOR PRODUCING CIRCULAR SAWS
Filed Jan. 6, 1943 2 Sheets-Sheet 2
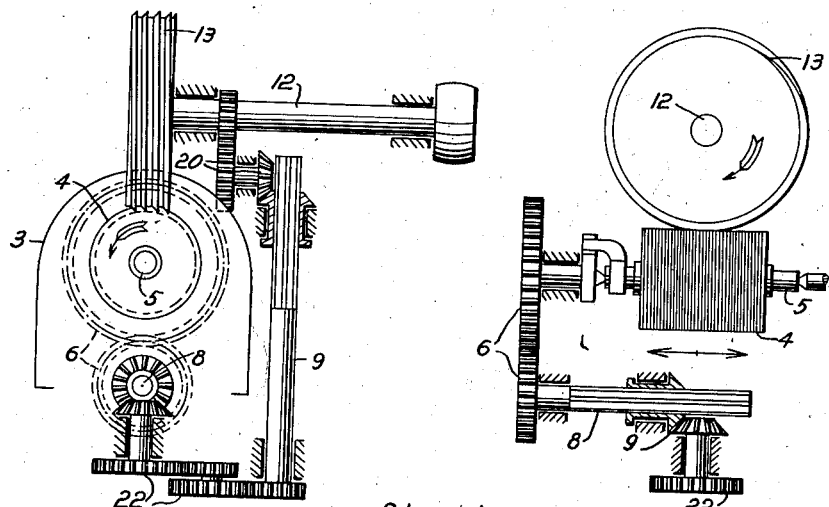
Fig. 3.
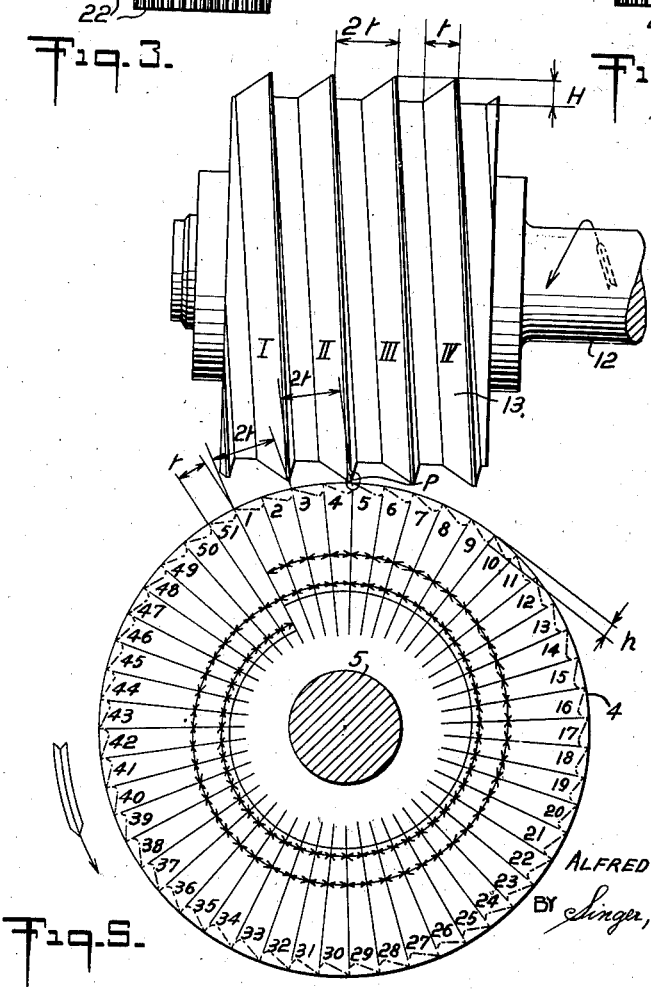
Fig. 4.
Fig. 5.
INVENTOR
ALFRED RICKENMANN
BY Singer, Ehlert, Stern & Carlberg
ATTORNEYS Patented Oct. 30, 1945

2,388,183

UNITED STATES PATENT OFFICE 2,388,183

MACHINE FOR PRODUCING CIRCULAR SAWS

Alfred Rickenmann, Zurich, Switzerland

Application January 6, 1943, Serial No. 471,441
In Germany November 15, 1941

5 Claims. (Cl. 76—38)

The present invention relates to a machine for producing circular saws by grinding the teeth in the blanks.

The invention relates more particularly to a machine of the said type in which a rotary helical teeth grinding element is used to produce the teeth.

The invention consists in that the head of the said helical teeth grinding element bears a certain relation to the circumference of the blanks in such a manner that while the blank makes one full turn the first, the third, the fifth etc. tooth is cut while on the next following turn of the blank the second, the fourth, the sixth, etc., is produced. The new manner of producing teeth by grinding is very speedy and gives high class circular saws.

In the drawings a machine is shown in a diagrammatical manner:

Figs. 3 and 4 show in a diagrammatical manner the driving elements for the blanks and for the hob.

Fig. 5 illustrates the working of the hob, while producing a circular saw.

Figure 1:
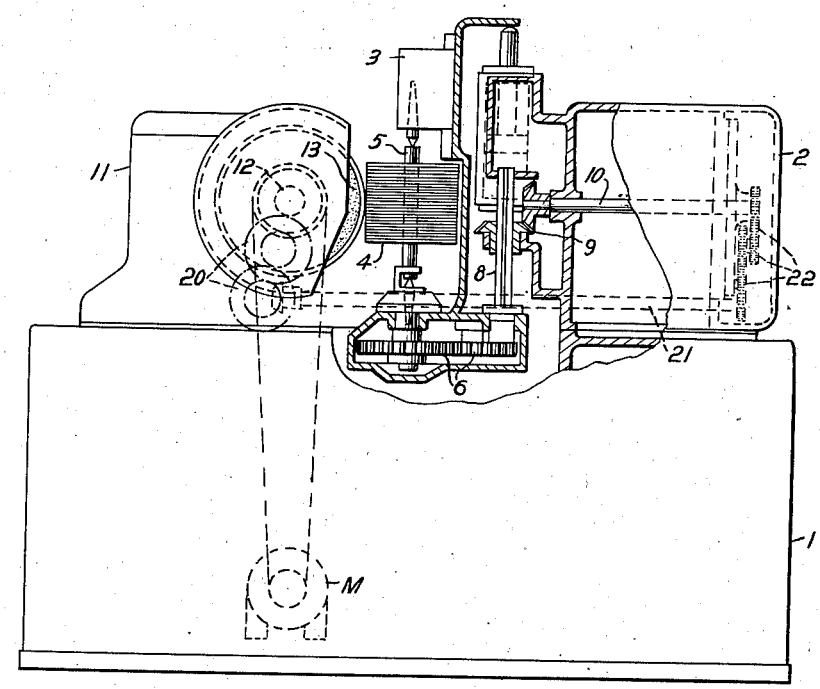
Fig. 1 is a side elevation parts being shown in section
Figure 2:
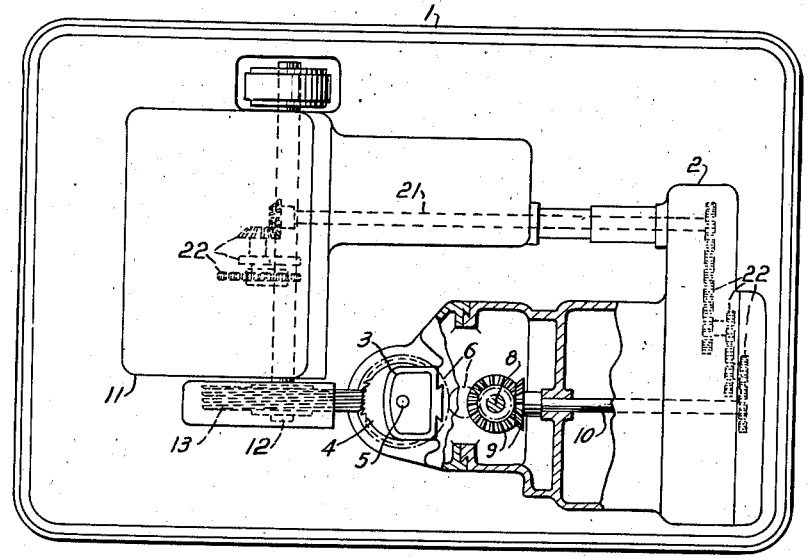
Fig. 2 is a ground plan parts being broken away

On a base 1 a gear casing 2 is arranged on which a carriage 3 is mounted running on vertical guide ways of the casing 2. The carriage 3 is moved up and down by a hydraulic drive of known construction. On the carriage 3 an arbor 5 is arranged running on points and being driven by a dog fixed to a driver plate. The latter is driven by a train 6 of change speed gears which transmit the turns of a shaft 8 journalled in the carriage 3 to said arbor 5. The shaft 8 is driven from a horizontal shaft 10 by bevel gears. The shaft 10 is driven by a motor M and transmission gears of any known construction. On the arbor 5 a pack 4 of circular disks are fastened into which the teeth have to be ground. To produce the teeth a rotary grinding disk 13 having a spirally disposed profiled rib of abrading material is provided. The disk 13 is mounted on a shaft 12 which is driven by the motor M. The shaft 12 drives by a set of gears 20 a shaft 21 journalled in the base 1 which shaft 21 drives by a further set of gears 22 the shaft 10, the latter driving the arbor 5 by the said bevel gears 9, shaft 8 and change speed gears 6. The shaft 8 is provided with a sliding key passing through a keyway in the bevel gear 9. The carriage 3 may be reciprocated in such a manner that the disk 13 grinds teeth in all the blanks 4 while they are positively rotated by the shaft 12.

The machine works as follows:

The pitch of the teeth in the blanks 4 equals $t$ and number of teeth equals $x$. The number of teeth that is $x$ is to be an uneven number. The disk 13 is a single thread grinding worm, the lead is equal to $2t$. The ratio of speed of the arbor 5 and the disk 13 is such that while the disk 13 makes one full turn any point on the circumference of the blank 4 moves for a distance equal to $2t$. If the blank 4 has to receive 51 teeth then the pitch will be equal to $1/51$ of the circumference and the lead of the disk 13 is equal to $2/51$. In Fig. 5 the teeth are numbered 1 to 51 and are shown in broken lines. In said Figure 5 a point P of the thread II is in touch with the point O of the circumference of the blank 4. After a full turn of the disk 13 the thread III of the disk 13 will start to grind the tooth numbered 5. After 25 turns of the disk 13 the cutting of 25 teeth has been started, the teeth being apart a distance equal to $2t$. The blank 4 has been turned for $$\frac{25 \times 2}{51} = 50/51$$

of its whole circumference. The distance of a tooth which will be cut at the 26th turn of the hob 13 from the tooth which had been cut at the end of the 25th turn of the disk 13 is equal to the pitch $t$. At the 27th turn of the disk 13, the tooth 2 is being cut in the middle between the tooth 1 and the tooth 3. The teeth with even numbers are now cut while the disk performs its 28 to 51 turns. At the end of the 51st turn of the disk 13 the blank 4 has performed two full rotations. The hob 13 and the blank assume again the position shown in Fig. 5. The point P of the disk 13 will again grind on the tooth with the number 1 of the blank 4, while the disk 13 has been fed towards the blank 4 to the full depth $h$.

The thread on the disk 13 is profiled according to the shape of the teeth desired on the blank 4. The height H of the thread on the disk 13 is slightly in excess of the depth $h$ of the teeth on the blank 4.

The blanks 4 are hardened before they are fastened to arbor 5 and the teeth are cut in the hardened blanks. The teeth produced are sharp and need no further dressing or sharpening.

What I wish to secure by United States Letters Patent is:

1. A method for producing sharp edge teeth on circular blanks with an uneven number of teeth by means of a rotary grinding disc with helically disposed grinding thread, including the steps of driving the grinding disc and the blank, while in operative engagement with each other, at a pretermined speed ratio with respect to one another grinding by alternate revolutions of the blank and continuous unidirectional rotation of the grinding disc the odd numbered teeth into the blank, and grinding by alternate revolutions of the blank timely interposed between the first mentioned alternate revolutions of the blank the even numbered teeth thereof, while continuing rotation of the tool and the blank in the same direction.

2. A method of producing saw teeth on circular blanks by means of a rotary grinding disc having a helical disposed grinding thread, including the step of driving the rotary grinding disc and the blank, while in operative engagement with each other, at a predetermined speed ratio with respect to one another which is such that upon completion of one revolution by the grinding disc the circumference of the blank has been rotated a distance equal to twice the pitch of the helix on the grinding disc, and the length of the perimeter of the blank is such that upon completion of one revolution of the blank the grinding disc helix will be displaced a distance equal to one pitch with respect to the teeth cut into the blank during the preceding revolution of the same, so that during the next revolution the helix will cut another series of teeth into the blank, which teeth are arranged between the teeth produced during said preceding revolution.

3. A method of producing saw teeth on circular blanks by means of a rotary grinding disc provided with a single thread grinding rib, including the steps of forming a stack of superimposed circular blanks, positively rotating said stack of blanks about its center axis and also said rotary grinding disc, while in operative engagement with each other, at a predetermined speed ratio with respect to one another which is such that upon completion of one revolution by the grinding disc the circumference of the blanks has been rotated a distance equal to twice the pitch of the helix on the grinding disc, and the length of the perimeter of the blanks is such that upon completion of one revolution of the blanks the grinding disc helix will be displaced a distance equal to one pitch with respect to the teeth cut into the blanks during the preceding revolution of the same, so that during the next revolution the helix will cut another series of teeth into the blanks, which teeth are arranged between the teeth produced during said preceding revolution, and moving said stack of blanks lengthwise of its axis of rotation during its rotative movement to bring all blanks successively in engagement with said grinding disc.

4. In a machine for producing circular saws, a rotary grinding disc provided with a helical grinding thread, a work-supporting arbor arranged transversely with respect to the axis of rotation of said grinding disc and adapted to have circular blanks of predetermined diameter fixedly attached thereto, and means for continuously driving said grinding disc and said arbor at a predetermined speed ratio with respect to each other, which ratio is such that upon completion of one revolution by the grinding disc the circumference of the blank will have been rotated a distance equal to twice the pitch of the helix on the grinding disc, and that upon completion of one revolution of the blank the grinding disc helix during the next revolution of said blank will cut teeth which are arranged midway between the teeth cut during the preceding revolution of the blank.

5. In a machine for producing circular saws, a rotary grinding disc provided with a helical grinding thread, a work-supporting arbor arranged transversely with respect to the axis of rotation of said grinding disc and adapted to have a stack of circular blanks of predetermined diameter fixedly attached thereto, means for continuously driving said grinding disc and said arbor at a predetermined speed ratio with respect to each other, which ratio is such that upon completion of one revolution by the grinding disc the circumference of the blanks will have been rotated a distance equal to twice the pitch of the helix on the grinding disc, and that upon completion of one revolution of the blanks the grinding disc helix during the next revolution of said blanks will cut teeth which are arranged midway between the teeth cut during the preceding revolution of the blanks, and means for moving said arbor with said stack of blanks thereon lengthwise of its axis of rotation independently of said driving means, whereby all of the blanks in said stack are provided with saw teeth by said rotary grinding disc.

ALFRED RICKENMANN.